United States Patent [19]

Yatsu et al.

[11] Patent Number: 4,618,386

[45] Date of Patent: Oct. 21, 1986

[54] METHOD OF MAKING A MULTILAYERED CONTAINER

[75] Inventors: Tadao Yatsu; Nobuya Hinooka, both of Yamaguchi, Japan

[73] Assignee: Mitsui Petrochemical Industries, Ltd., Tokyo, Japan

[21] Appl. No.: 752,488

[22] Filed: Jul. 8, 1985

Related U.S. Application Data

[63] Continuation-in-part of Ser. No. 552,189, Nov. 15, 1983, abandoned.

[30] Foreign Application Priority Data

Nov. 15, 1982 [JP] Japan .................... 57-198898

[51] Int. Cl.$^4$ .............................................. B29C 49/04
[52] U.S. Cl. .............................. 156/242; 156/244.14; 156/244.24; 156/244.27; 264/523; 264/535
[58] Field of Search ............ 156/242, 243, 245, 244.27

[56] References Cited

U.S. PATENT DOCUMENTS

| | | | |
|---|---|---|---|
| 3,871,947 | 3/1975 | Brekken | 156/244.24 |
| 4,315,725 | 2/1982 | Toshimo | 264/535 |
| 4,396,816 | 8/1983 | Krishnakumar et al. | 264/535 |
| 4,405,400 | 9/1983 | Petersen-Hoj | 156/244.11 |

*Primary Examiner*—Caleb Weston
*Attorney, Agent, or Firm*—Armstrong, Nikaido, Marmelstein & Kubovcik

[57] ABSTRACT

Anti-gas permeation property and impact strength of a container such as a bottle which is made of polyethylene terephthalate resin by biaxially orienting blow molding are improved by using a multilayered structure of the polyethylene terephthalate and the other polyester of a dicarboxylic acid component containing a specific amount of isophthalic acid and a glycol component. The container is made preferably by preparing a preform which is a laminate of the polyethylene terephthalate and the other polyester in the molten state under pressure, and by biaxially orienting blow molding the preform.

2 Claims, No Drawings

METHOD OF MAKING A MULTILAYERED CONTAINER

This application is a continuation-in-part of application Ser. No. 552,189, filed Nov. 15, 1983, abandoned.

BACKGROUND OF THE INVENTION

1. Field of the Invention

The present invention concerns a multilayered container made of polyester resins by biaxially orienting blow molding. The invention concerns also the method of making the container. The container according to the present invention has a high anti-gas permeation property and a high bonding strength between the layers.

2. State of the Art

Biaxially oriented shaped articles of polyethylene terephthalate resin (hereinafter referred to as "PET") exhibit good mechanical strength, toughness, heat resistance, chemical resistance, oil resistance and transparency, and are widely used as packaging materials such as films, sheets and containers.

However, containers of PET made by biaxially orienting blow molding have some drawbacks. For example, they cannot be sufficiently heatset, and anti-gas permeation property is dissatisfactory. Particularly, insufficiency of the anti-gas permeation is inherent in PET, and it has been difficult to solve this problem by processing technic.

As a way of improving the anti-gas permeation property of the containers made of PET, it has been tried to laminate PET with a resin having anti-gas permeation property better than that of PET such as poly vinylidene chloride, saponified ethylene-vinyl acetate copolymer and polyamide. All of these resins have poor adhesive property with PET, and therefore, even a three-layered structure with PET on both the sides may be partially delaminated while being subjected to orienting processing or using, and the anti-gas permeation property will decrease.

SUMMARY OF THE INVENTION

An object of the present invention is to provide a container made of polyester resins having a good anti-gas permeation property. This object can be achieved by laminating PET with another polyester resin which is made mainly from isophthalic acid.

Another object of the present invention is to provide a method of making a container of polyester resins having a good anti-gas permeation property and a high impact strength. This object can be achieved by preparing a blank or preform obtained by laminating PET under specific conditions with a polyester made mainly from isophthalic acid in the molten state, and then, by biaxially oriented blow molding.

PREFERRED EMBODIMENTS OF THE INVENTION

The multilayered container according to the present invention is characterized in that it comprises (A) a layer of polyethlene terephthalate, and (B) a layer of the polyester consisting of a dicarboxylic acid component containing isophthalic acid in an amount exceeding 20 molar % and a glycol component principally consisting of ethylene glycol; and that at least the polyethylene terephthalate layer is biaxially oriented.

The PET, polyethlene terephthalate, used in the present invention is a crystaline thermoplastic polyester resin in which at least 80 molar %, preferably 90 molar % or more of the dicarboxylic acid component is terephthalic acid, and at least 80 molar %, preferably 90 molar % or more of the glycol component is ethylen glycol. The other dicarboxylic acids are aromatic dicarboxylic acids such as isophthalic acid, diphenylether-4,4'-dicarboxylic acid and naphthalene-1,4- or -2,6- dicarboxylic acid; aliphatic dicarboxylic acids such as oxalic acid, succinic acid, adipic acid, cebatic acid, and undecane-dicarboxylic acid; and cycloaliphatic dicarboxylic acids such as hexahydro-terephthalic acid. The other glycols are aliphatic glycols such as propylene glycol, 1,4-butane diole and neopenthyl glycol; cycloaliphatic glycols such as cyclohexane dimethanol; and aromatic dihydroxy compounds such as bisphenol A. As far as the polyester contains terephthalic acid and ethylene glycol in the amounts mentioned above, the polyester may be either a copolymer or a mixture of PET and other polysters.

The polyester layer(B) to be laminated to the PET layer(A), in which the dicarboxylic acid component principally consists of isophthalic acid, should be a non-crystaline or low-crystaline polyester composed of the dicarboxylic acid component containing isophthalic acid in an amount exceeding 20 molar %, preferably, 30 molar % or more, and more preferably, 40 molar % or more; and the glycol component principally consisting of ethylene glycol. In the case where isophthalic acid is 20 molar % or less, the improvement of the anti-gas permeation property is so small that the object of the present invention may not be achieved.

Examples of the dicarboxylic acids other than isophthalic acid are aromatic dicarboxylic acids such as terephthalic acid, diphenyl-4,4'-dicarboxylic acid, diphenylether-4,4'-dicarboxylic acid and naphthalene-1,4- or 2,6- dicarboxylic acid; aliphatic dicarboxylic acids such as oxalic acid, succinic acid, adipic acid, cebatic acid and undecane dicarboxylic acid; and cycloaliphatic dicarboxylic acid such as hexahydro terephthalic acid.

The glycol component mainly consisting of ethylene glycol should contain ethylene glycol in an amount of at least 80 molar %, preferably, 90 molar % or more. Examples of the glycols other than ethylene glycol are aliphatic glycols such as propylene glycol, 1,4-butane diole and neopenthyl glycol; cycloaliphatic glycols such as cyclohexane dimethanol; and aromatic dihydroxy compounds such as bisphenol A.

Typical examples of the polyester (B) are polyethylene isophthalate, and polyethylene isophthalate-polyethylene terephthalate copolymer in which the content of isophthalic acid in the dicarboxylic acid component exceeds 20 molar %. Molecular weight of polyester (B) should be such a value that the inherent viscosity $[\eta]$ measured in a mixed solvent of phenol/tetrachlorethane $=1/1$ (weight ratio) at 25° C. may be in the range from 0.6 to 1.3 dl/g.

Glass-transition temperature (Tg) of polyester (B), which is non-crystaline or low-crystaline polyeter, is, although there is no limitation, preferably 55° to 90° C. The polyester having a Tg lower than 55° C. shows low heat resistance, and the polyester having a Tg higher than 90° C. may not be fully oriented when subjected to biaxial orientation with PET at a temperature suitable for orientation of PET. The Tg mentioned above is measured using a DSC (differential scanning calorimeter) at a temperature increasing rate of 10° C./min.

The above PET(A) and polyester(B) used in the present invention may contain heat stabilizing agents, weatherability improving agents, lubricants, nucleating agents, pigments, dye-stuffs and any other organic and inorganic fillers as far as the merits of the present invention are not damaged.

The multilayered container of the present invention may have any structure as far as it has the layer structure of PET(A)/polyester(B), and either PET(A) or polyester(B) may be inner layer or outer layer. Also, the container may be of a three-layered structure having PET(A) or polyester(B) as the internal layer such as B/A/B or A/B/A. A four- or more-layered structure may also be used. If necessary, an adhesive is used between the layers of PET(A) and polyester(B).

Thickness of the layers of PET(A) and polyester(B) is not limited. Usually, at the body of a bottle, the thickness of PET(A) is preferably 100 to 600 micron, more preferably, 200 to 500 micron; and the thickness of polyester(B) is preferably 10 to 350 micron, more preferably, 60 to 200 micron. Total thickness is 200 to 700 micron in practical use, and preferably, 300 to 600 micron.

The multilayered container of the present invention can be made by a conventional biaxially orienting blow molding of PET.

A typical method comprises preparing a multilayered parison by injection molding with a conventional injection molding machine or an injection molding machine having plural injecting devices, or by extruding a multilayered tube with a multilayer extruding machine and bottom-closing of the extruded multilayered tube; and blow molding the parison in a blow mold at a temperature from 90° to 130° C. suitable for orienting PET under drawing of 1.5 to 2.5 times in the axial direction with an axially moving rod and 2 to 5 times in the radial directions with the blowing air. Either the two-stage method using a cold parison or the hot parison method may be used. The lamination or the multilayered structure may be over whole the bottle or limited to the part under the neck.

However, it is preferable to make the multilayered container of the present invention by the method according to the present invention. The containers made by the preferable method exhibit, in addition to the good anti-gas permeation property, particulry high impact strength.

The method of making the multilayered container of the present invention comprises laminating a layer of molten PET(A) and a layer of molten polyester(B) consisting of a dicarboxylic acid component containing isophthalic acid in an amount exceeding 20 molar % and a glycol component principally consisting of ethylene glycol, the temperatures of layer(A) and layer(B) being 230° to 350° C. and 180° to 260° C., respectively, under a pressure (gauge) of 20 kg/cm$^2$ or higher; cooling and solidifying the laminate to a temperature of $-10°$ to 30° C. so as to prepare a preform which comprises essentially of the layer of PET(A) and the layer of polyester(B); and biaxially orienting and blow molding at an orientation temperature of 80° to 130° C. under drawing of at least 1.5 times in the axial direction and at least 2 times in the radial directions.

The temperatures of the molten PET(A) and the molten polyester(B) in the above mentioned ranges will give suitable melt viscosities which is favorable for processing. The laminating pressure of 20kg/cm$^2$ or higher increases bonding strength between the layer of PET(A) and the layer of polyester(B) to enhance the impact strength of the produced container. The drawing temperature is chosen in view of the facts that the temperature lower than 80° C. causes cold drawing resulting in decreased clarity, and that the temperature above 130° C. causes uneven thickness in the product container. The drawing ratios of 1.5 times or more (axial direction) and 2 times or more (radial directions) are required for ensuring the anti-gas permeation property and the impact strength.

In order to prepare the preform, there may be used some methods. A typical example of the method comprises melting the PET(A) and the polyester(B) in two extruders, feeding the molten resins to a co-extrusion die to extrude a multilayered tube under a pressure of 20kg/cm$^2$ or higher, and, after cooling the tube to the above noted temperature, processing the bottom and the mouth. Another typical method comprises melting the PET(A) and the polyester(B) in two injection molding machines and multilayer-injection molding the molten resins of the above noted temperatures in a single mold.

The multilayered containers according to the present invention have improved anti-gas permeation property in comparison with the conventional biaxially oriented containers made of PET only, and possess toughness, clarity and mechanical strength inherent in PET. The present containers have a bonding strength between the layers better than that of multilayered containers made of PET and poly vinylidene chloride or saponified ethylene-vinyl acetate copolymer. Also, it does not need special processing necessary for poly vinylidene chloride. Thus, the present containers are suitable for containers for beer, refreshing drink and fruit juice.

Particulary, the multilayered containers made by the method according to the present invention have improved bonding strength between the layers because the layers of PET(A) and polyester(B) are laminated under pressure while they are in the molten state, and therefore, exhibit further improved impact strength.

The present invention is further explained with reference to the following examples, which are just illustrative and do not limit the invention.

EXAMPLE I

PET 1 (PET "J-025" Mitsui Petrochemical Ind. Ltd.) was injection-molded, at 280° C. and 40 kg/cm$^2$ (gauge), and on the thus obtained molded article (layer) maintained at 280° C., polyethylene isophthalate (hereinafter referred to as "PEI", Tg: 62° C., [$\eta$]: 0.83 dl/g) was also injection-molded at 240° C. and 40 kg/cm$^2$ (gauge) to form a preform.

The preform was then heated with an infrared heating device to 85° to 95° C., and the heated preform was blow-molded with an orienting blow molding machine under drawing of about 2.5 times in the axial direction and about 4.3 times in the radial directions to form a bottle of content about 1 liter with the PET layer of about 150 micron thick and the polyester layer of about 150 micron at the thinnest part.

The oxygen gas permeability of the bottle was measured with "OXTRAN" (made by MOCON) to give 0.08ml/day bottle atm. Also, the carbon dioxide gas permeability was measured with "PERMATRAN C-IV" (also made by MOCON) to give 1.5ml/day bottle atm.

Control I

The same PET as used in Example I was injection molded at 280° C. and 40 kg/cm² (gauge) to prepare the same sized preform made of PET only.

The preform was then blow-molded to form an oriented bottle of content about 1 liter of about 300 micron thick at the thinnest part.

The oxygen permeability and the carbon dioxide gas permeability were measured with the same apparatus as used in Example I, and obtained the results of 1.10ml/day.bottle.atm. and 4.0ml/day.bottle.atm., respectively.

EXAMPLE II

Instead of the PEI in Example I, a copolymer of polyethylene isophthalate 70 molar % and polyethylene terephthalate 30 molar % (Tg : 64° C., $[\eta]$: 0.80 dl/g) was by using the procedures of Example I, to form an oriented bottle of content about 1 liter, injection molded at 240° C. and 40 kg/cm² (gauge) onto the PET article, maintained at 280° C., as in Example I, having a PET layer of 150 micron thick and a copolymer layer of 150 micron thick at the thinnest part.

The oxygen permeability and the carbon dioxide gas permeability were measured. The results were: 0.12ml/day. bottle.atm. and 2.3 ml/day.bottle.atm., respectively.

EXAMPLE III

Instead of the PEI in Example I, a copolymer of polyethylene isophthalate 50 molar % and polyethylene terephthalate 50 molar % (Tg: 65° C., $[\eta]$: 0.78 dl/g) was injection molded at 240° C. and 40 kg/cm² (gauge) onto the PET article, maintained at 280° C., as in Example I, to form an oriented bottle of content about 1 liter as made in Example I.

The oxygen permeability and the carbon dioxide gas permeability were measured. The results were: 0.31 ml/day bottle.atm. and 2.7 ml/day.bottle.atm., respectively.

EXAMPLE IV

Instead of the PEI in Example I, a copolymer of polyethylene isophthalate 30 molar % and polyethylene terephthalate 70 molar % (Tg: 67° C., $[\eta]$: 0.78 dl/g) was injection molded at 260° C. and 40 kg/cm² (gauge) onto the PET article, maintained at 280° C., as in Example I, to form an oriented bottle of content about 1 liter having a PET layer of 150 micron thick and a copolymer layer of 150 micron thick at the thinnest part.

The oxygen permeability and the carbon dioxide gas permeability were measured. The results were: 0.52 ml/day. bottle.atm. and 3.2 ml/day.bottle.atm., respectively.

Control II

Instead of the PEI in Example I, a copolymer of polyethylene isophthalate 10 molar % and polyethylene terephthalate 90 molar % (Tg: 69° C., $[\eta]$: 0.75 dl/g) was injection molded at 270° C. and 40 kg/cm² (guage) onto the PET article, maintained at 280° C., as in Example I, to form an oriented bottle of content about 1 liter having a PET layer of 150 micron thick and a copolymer layer of 150 micron at the thinnest part.

The oxygen permeability and the carbon dioxide gas permeability were measured. The results were: 0.85 ml/day bottle.atm. and 3.6 ml/day.bottle.atm., respectively.

EXAMPLE V

A copolymer of polyethylene isophthalate 70 molar % and polyethlene terephthalate 30 molar % (Tg: 64° C.) was injection-molded at 280° C. and 40 kg/cm² (gauge), and then, the PET -1 was also injection-molded, while the PET-1 was maintained at 280° C., to prepare a preform in which the PET layer and the copolymer layer of Example II changed their places.

The preform was blow-molded to form an oriented bottle of content about 1 liter having the copolymer layer of 150 micron thick and the PET layer of 150 micron thick at the thinnest part.

The oxygen gas permeability and the carbon dioxide gas permeability of this bottle were 0.13ml/day.bottle.atm. and 2.0ml/day.bottle.atm., respectively.

EXAMPLE VI

PET-2 ("Mitsui PET J-055" made by Mitsui Petrochemical Ind. Ltd.,) was dried at 150° C. for 3 hours and melted in an extruder of 90mm diameter at 280° C., and the PEI was dried at 50° C. for 24 hours and melted in another extruder of 40 mm diameter at 230° C. The melted resins were fed to a ring die of two resins-three layers and extruded therefrom at the temperature of 230° C. for the PEI and at a temperature of 280° C. for the PET-2 and at the pressure (gauge) of 80 kg/cm² to a three-layered tube of the structure PET-2/PEI/PET-2 (1.2/1.2/1.2 mm thick), and the extruded tube was cooled with water of 10° C. to give a three-layered tube of 24.8 mm outer diameter and 3.6 mm thick. The tube was cut to a suitable length, and one end thereof was heated to melt to close the bottom and the other end was also heated to melt for shaping the mouth of the bottle. The preform was 16.5 cm long and 50 g weight.

The preform was then blow-molded with a biaxially orienting blow molding machine "LB-01" (made by CORPOPLAST) under the conditions of blowing air pressure 25 kg/cm², preform heating period 15 seconds, drawing temperature 115° C., biaxial drawing of 2.5 times in the axial direction and 4 times in the radial directions to form a multilayered bottle of content 1.5 liter (PET-2/PEI/PET-2 = 120/120/120 micron)

The oxygen permeation and carbon dioxide gas permeation of this bottle were measure to be 0.14 ml/day.bottle.atm. and 2.0 ml/day.bottle.atm., respectively.

Then, the bottle was filed with water of 0° C. and dropped down to determine the minimum height at which the bottle is destroyed. Up to 2.0 m, the bottle was not destroyed, and no delamination between the layers was observed.

Control III

Example VI was repeated under the same conditions except for the molding pressure which was changed from 80 kg/cm² to 10 kg/cm² to make a multilayered bottle.

The oxygen permeability and the carbon dioxide gas permeability of the bottle were such good values as 0.16 ml/day. bottle.atm. and 2.1 ml/day.bottle.atm., respectively. However, when the bottles was subjected to the dropping test, it was damaged by dropping from the height less than 1 meter.

EXAMPLE VII

PET-3("Mitsui PET J-135") dried at 150° C. for 3 hours was melted at 280° C. in an injection molding machine, and PEI dried at 50° C. for 24 hours was melted at 210° C. in another injection molding machine. These molten resins were injection molded, at a temperature of 280° C. for the PET-3 and at a temperature of 210° C. for the PEI and at a pressure of 40 kg/cm$^2$ (gauge) for both, with a two-layer injection molding machine equipped with a single preform mold, which was cooled at 10° C., under pressure of 200 kg/cm$^2$ to form a two-layered preform consisting of inner layer PET-3/outer layer PET (thickness: 1.6/1.6 mm), 24.8 mm outer diameter and 3.2 mm thick.

The preform was blow molded with the biaxially orienting blow molding machine used in Example VI under the same conditions as Example VI to make a multilayered bottle (PET-3/PEI=150/150 micron) of content 1 liter.

The oxygen gas permeation of this bottle was 0.09 ml/day. bottle.atm., and the carbon dioxide gas permeation was 0.8 ml/day. bottle.atm. Dropping test showed that the bottle was destroyed when dropped from 1.4 meter high, but the delamination was not observed.

Control IV

Firstly, PET-3 was injection molded at 280° C. and 10 kg/cm$^2$ (gauge), and PEI was injection molded at 210° C. and 10 kg/cm$^2$ (gauge) on the above obtained PET-3 injection molded article, maintained at 280° C., in a larger mold to prepare a two-layered preform having the same structure as that of Example VII.

The preform was biaxially oriented and blow molded under the same conditions of Example VII to make a multilayered bottle (PET-3/PEI=150/150 micron) of content 1.0 liter.

The oxygen gas permeation of this bottle was 0.10 ml/day. bottle.atm., and the carbon dioxide gas permeation was 0.8 ml/day. bottle.atm. However, the bottle easily destroyed when subjected to the dropping test.

We claim:

1. A method of making a multilayered container comprising (1) laminating a layer of molten polyethylene terephthalate (A) and a layer of polyester (B) consisting of a dicarboxylic acid component containing isophthalic acid in an amount exceeding 20 molar % and a glycol component comprising ethylene glycol in an amount exceeding 80 molar %, while layer (A) and layer (B) are maintained at a temperature of 230° to 350° C. and 180° to 260° C., respectively, under a pressure (gauge) of 20 kg/cm$^2$ or higher; (2) cooling and solidifying the laminate to a temperature of $-10$ to 30° C. so as to prepare a preform which comprises essentially of the layer of polyethylene terephthalate (A) and the layer of polyester (B); and (3) biaxially orienting and blow molding the preform at an orientation temperature of 80° to 130° C. under drawing of at least 1.5 times in the axial direction and at least 2 times in the radial directions.

2. The method of claim 1, wherein the amount of isophthalic acid in the polyester (B) is 30 molar % or more.

* * * * *